United States Patent [19]

Chang et al.

[11] Patent Number: 4,564,664

[45] Date of Patent: Jan. 14, 1986

[54] EMULSION-ACRYLIC PRESSURE-SENSITIVE ADHESIVES FORMED IN TWO STEP POLYMERIZATION

[75] Inventors: Man-Chium Chang, Los Angeles; Chung-Ling Mao, Arcadia; Richard R. Vargas, South Gate, all of Calif.

[73] Assignee: Avery International Corporation, Pasadena, Calif.

[21] Appl. No.: 522,491

[22] Filed: Aug. 12, 1983

[51] Int. Cl.[4] .................... C08F 222/10; C08F 120/04
[52] U.S. Cl. ...................... 524/833; 526/87; 526/325; 526/318.43; 526/931
[58] Field of Search .................... 526/325, 87, 317

[56] References Cited

U.S. PATENT DOCUMENTS

| | | | |
|---|---|---|---|
| 2,544,692 | 3/1951 | Kugla et al. | 526/325 |
| 2,623,036 | 12/1952 | Neher et al. | 526/325 |
| 2,642,414 | 6/1953 | Bauer et al. | 526/325 |
| 3,073,791 | 1/1968 | Barkhuff | 526/317 |
| 3,324,056 | 6/1967 | Nona et al. | 526/325 |
| 3,449,300 | 6/1969 | Florombe et al. | 526/87 |
| 3,464,114 | 10/1968 | Snyder et al. | 526/87 |
| 3,732,184 | 5/1973 | Findlmann et al. | 526/87 |
| 3,923,752 | 12/1975 | Suse et al. | 526/317 |
| 4,137,389 | 1/1979 | Wingler et al. | 526/87 |

*Primary Examiner*—Joseph L. Schofer
*Assistant Examiner*—Peter F. Kulkosky
*Attorney, Agent, or Firm*—Christie, Parker & Hale

[57] ABSTRACT

Pressure-sensitive adhesives are formed of a diester of fumaric acid, preferably dibutyl fumarate; an alkyl acrylate, preferably 2-ethylhexylacrylate; an alkyl methacrylate, preferably methylmethacrylate; and, desirably, a crosslinkable carboxylic acid. The adhesives are preferably formed in two-stage, free-radical polymerization.

27 Claims, 3 Drawing Figures

Fig. 1

EMULSION-ACRYLIC PRESSURE-SENSITIVE ADHESIVES FORMED IN TWO STEP POLYMERIZATION

BACKGROUND OF THE INVENTION

The present invention pertains to novel, acrylic-based, fumaric-acid-ester interpolymers useful as pressure-sensitive adhesives in which, surprisingly, peel and tack values of the adhesive can be modified without affecting cohesive strength, as measured as shear.

U.S. Pat. No. 2,544,692 to Kuegler et al discloses copolymerization of an acrylic ester with minor amounts of a fumarate di-ester. Emulsion and bulk polymerization are stated as being feasible.

U.S. Pat. No. 2,642,414 to Bauer et al discloses preparation of copolymers of any ester of methacrylic acid and a saturated aliphatic monohydric alcohol and a maleinoid ester of a saturated aliphatic monohydric alcohol of from 4 to 14 carbon atoms, and certain organic acids. The maleinoid esters include dibutyl fumarate. The polymers prepared were used to modify the pour point of hydrocarbon oils.

Adhesives for hydrophobic polymers containing an interpolymerized amount of a vinyl acetate, a mono- or di-alkyl ester of an alpha, beta ethylenically-unsaturated dicarboxylic acid (e.g. dibutyl fumarate) or mixture thereof, are disclosed in U.S. Pat. No. 3,275,589 to Alexander et al as being prepared by an emulsion polymerization process.

In the pressure-sensitive adhesive art, cohesive strength is measured by shear or shear strength, which is the resistance of adhesive joints to shear stresses, and is measured as the force per unit area sheared at failure. Shear is parallel to the adhesive joint.

Peel or peel strength is measured by drawing an adhesive applied to a substrate at some angle to the substrate, usually 90° or 180°. Tack is the resistance offered by the adhesive film to detachment from an adhered surface. It is a measure of stickiness of an adhesive, or the ability to form an instant bond when brought into low-pressure contact with a substrate to which adhesive is to be adhered.

Up until now, it has been generally accepted in the art that cohesive strength may be sacrificed to increase peel and tack values of an adhesive.

SUMMARY OF THE INVENTION

The present invention is directed to novel, pressure-sensitive adhesive systems prepared by emulsion polymerization that contain an interpolymerized amount of at least one dialkyl ester of fumaric acid, which controls peel and tack, and an interpolymerized amount of at least one hard monomer, which independently controls cohesive strength, or shear, of the pressure-sensitive adhesive.

The copolymers provided as pressure-sensitive adhesives of the instant invention comprise from about 50% to about 95% by weight, based on the total weight of the monomers, of soft monomers, of which up to about 30% by weight, preferably from about 5% to about 30% by weight, based on the total weight of the monomers, is one or more diester(s) of fumaric acid in which each ester group independently contains from about 2 to about 8 carbon atoms. The balance of the soft monomer(s) is comprised of an alkyl acrylate containing from 2 to about 10 carbon atoms. The balance of the monomer system is comprised of hard monomers, at least one of which is alkyl methacrylate containing from about 2 to about 6 carbon atoms present in amount up to about 25% by weight, based on the total weight of the monomers. There may be included as a hard monomer, optionally but desirably, at least one unsaturated carboxylic acid containing from about 2 to about 8 carbon atoms present in an amount of from 0% to about 10% by weight, preferably from about 2% to about 7% by weight, based on the total weight of the monomers.

It is presently preferred that the pressure-sensitive adhesives of this invention contain, on an interpolymerized basis and based on the total weight of the monomers, from about 5% to about 30% by weight dibutyl fumarate, and from about 55% to about 90% by weight 2-ethylhexylacrylate. Methyl methacrylate is present in an amount of up to about 25% by weight, more preferably in an amount of from about 10% to about 25% by weight. The interpolymers preferably contain from about 2% to about 7% by weight acrylic acid.

Using the preferred monomer system, it has been determined that peel and tack are influenced by the concentration of diester of fumaric acid, and increases with fumarate contact. Cohesive strength is independently controlled by hard-monomer content, and increases as the concentration of this hard monomer increases. The two are mutually-independent controls, which is surprisingly unusual for pressure-sensitive adhesives, since an increase in peel and tack is normally to the sacrifice of cohesive strength. The polymer systems formed in accordance with the instant invention have a glass-transition temperature in the range of from about 30° to about 70° C. below the use temperature, preferably from about 50° to about 70° C. below the use temperature. The polymers are formed by emulsion polymerization, preferably by two-stage polymerization, in which all of the fumarate diester, which is a relatively slow reactant, is charged to the reaction vessel where polymerization is initiated. A portion of the monomers may be added prior to initiation of polymerization. The balance of the monomers are added, after initiation of polymerization, over a period of time to ensure that the bulk of the polymerization is copolymerization, as opposed to mixed homopolymerization and copolymerization.

In the polymer system, the unsaturated carboxylic acid is an effective ingredient for modifying polymer properties, such as cohesive strength, and which can be controlled through crosslinking with a suitable agent, such as chromium acetate.

We have observed that if you replace the fumarate ester(s) with another monomer, the independently-controlled tack and peel are lost.

DETAILED DESCRIPTION

It has now been surprisingly found that emulsion-polymerized, pressure-sensitive adhesives based on dialkyl esters of fumaric acid, in combination with hard monomers, such as alkyl methacrylate, and at least one soft monomer, such as an alkyl acrylate, provide a pressure-sensitive adhesive in which the hard monomer can be used as a determinant of the cohesive strength of the pressure-sensitive adhesive, with cohesive strength increasing with hard-monomer content, and with mutually-independent control over the peel and tack properties of the adhesive being controlled by the concentration the dialkyl ester of fumaric acid.

In particular, pressure-sensitive adhesives of the instant invention are prepared by emulsion polymerization and comprise polymers containing up to about 30% by weight, based on the total weight of the polymer charge of at least one dialkyl ester of fumaric acid, preferably dibutyl fumarate, and up to about 25% by weight of a hard monomer, preferably lower alkyl methacrylate. It is presently preferred that the hardmonomer content include from 0% to about 10% by weight, more preferably from 2% to about 7% by weight, based on the total weight of the monomers, of an unsaturated carboxylic acid, preferably acrylic acid. The bulk of the monomer system consists of soft monomers, preferably alkyl acrylates, most preferably 2-ethylhexyl acrylate, provided in a concentration of from about 55% to about 94% by weight. In this polymer system, the unsaturated carboxylic acid is provided to enable cohesive-strength modification, such as by crosslinking.

In the system, cohesive strength is directionally proportional to the concentration of hard monomers, e.g., the lower alkyl methacrylate, and increases with an increase in the concentration of hard monomers.

Peel strength and tack are independently influenced by the concentration of the di-lower alkyl ester of fumaric acid, and increase with its concentration.

Polymers of optimum properties are preferably obtained in a two-step emulsion-polymerization process. A one-step emulsion-polymerization process is also useful, but substantially-lower adhesive values are obtained.

The present-preferred pressure-sensitive adhesives prepared in accordance with the instant invention contain from about 15% to about 30% by weight, based on the total weight of interpolymerized monomers of dibutylfumarate; from about 55% to about 75% by weight of 2-ethylhexylacrylate; from about 15% to about 25% by weight methylmethacrylate; and from about 2% to about 7% by weight acrylic acid.

As used herein, by the term, a "hard monomer", there is meant a monomer which, when homopolymerized, will yield a polymer of a high glass-transition temperature, normally a homopolymer having a glass-transition temperature greater than 0° C., preferably greater than about 10° C. Among such monomers there may be mentioned alkyl methacrylates, such as methylmethacrylates, ethylmethacrylates, butylmethacrylates, and the like; copolymerizable vinyl-unsaturated monomers, such as vinyl acetate, vinyl propionate, and the like; and styrenic monomers, such as styrene, methylstyrene, and the like; unsaturated carboxylic acids, such as acrylic acid, methacrylic acid, itaconic acid, fumaric acid, and the like. By the term, "soft monomer", there is a meant a monomer which, when homopolymerized, will yield a polymer of a low glass-transition temperature, i.e., Exemplary are the alkyl acrylates, such as butylacrylate, propylacrylate, 2-ethylhexylacrylate, isooctylacrylate, isodecylacrylate, and the like. Presently preferred is 2-ethylhexylacrylate.

The polymers prepared in accordance with the present invention, to be functional pressure-sensitive adhesives, must have a net effective glass-transition temperature of from about 30° to about 70° C. below the use temperature, preferably from about 50° to about 70° C. below the use temperature. Accordingly, the monomer used in the preparation of polymers of the instant invention are proportioned to provide polymerization products falling within the designated glass-transition temperature. It is for this reason that a soft monomer other than a diester of fumaric acid, preferably 2-ethylhexylacrylate, is provided as the bulk of the monomers employed.

Pressure-sensitive-adhesive polymers produced in accordance with the instant invention are preferably prepared by two-stage polymerization. There is initially formed a first emulsified-reaction system containing from about 80% to 100% of the total fumarate charge. The balance of the charge of the other of the monomers is formed as a second emulsified-reaction system.

Polymerization occurs with a conventional, free-radical catalyst. Thermal and redox systems, and like catalyst systems, may be used. Polymerization may occur at temperatures of up to about 100° C., preferably from ambient to about 50° C. The catalyst concentration will normally range from about 0.1% to about 1%, preferably from 0.1% to about 0.5% by weight, based on the total weight of the monomers. Once polymerization is initiated, the balance of the monomers are fed over a period of time ranging from 30 minutes to 30 hours.

Polymerization may also occur, the alternate, by a procedure, in which about 20% of the total charge of mixed monomers is added in proportions in which they appear in the polymer, with the balance added over a period of time. The polymers formed generally have a lower tack, with tack being as much as 50% less than polymers produced according to the preferred, two-step process.

EXAMPLES 1 to 5

There were formed five pressure-sensitive polymers from monomers provided for polymerization in the concentration shown in Table I. For the polymer of Example 1 to a stirred reaction vessel containing 40 parts-by-weight water, there was charged 0.01 part-by-weight ferric ion, 0.2 part-by-weight ammonium phosphate, 1 part-by-weight ammonium hydroxide, 2.5 parts-by-weight alkylaryl ether disulfonate as a surfactant, and 15 parts-by-weight dibutyl fumarate.

There was formed a second emulsified-monomer mix containing 30 parts-by-weight water, 2 -parts-by-weight sodium alkylaryl polyether sulfonate as an emulsifier, 62 parts-by-weight 2-ethylhexylacrylate, 18 parts-by-weight methylmethacrylate, 5 parts-by-weight acrylic acid, 0.3 part-by-weight tertiarybutyl hydrogen peroxide, and 0.06 part-by-weight dodecyl mercaptan. A reducing agent of 20 parts-by-weight water and 0.3 part-by-weight sodium formaldehyde sulphoxylate was also provided. While maintaining the reaction charge under a nitrogen atmosphere, the reactor was heated to 40° C. When the reactor temperature reached 40° C., 20% of the emulsified-monomer mix and 10% of the initiator were added. When the temperature reached 45° C., the balance of the emulsified mix was added at the rate of 2 parts per minute. The initiator charge was simultaneously introduced at a rate of 0.3 part per minute. Polymerization temperature was maintained in the range of from 45° to 50° C. After the emulsifiedmonomer mix was completed, the reaction vessel was maintained at 60° C. for approximately 1 hour, and the remaining sodium formaldehyde sulfoxylate solution was added at about 0.1 part per minute. After completion of the reaction, reactants were cooled to room temperature.

The reactor charge for Examples 2–5 was 170 parts-by-weight water; ferric-ion, complexed with ethylenediaminetetraacetic acid, was present in 0.1 part by weight, and ammonium hypophosphate in the amount of 1 part-by-weight ammonia was added to adjust pH to 9. Dowfax ® 2AO (40% active), manufactured and sold by Dow Chemical Company, was added in an amount of 30 parts by weight, and total dibutyl fumarate charge added per Table, for a total charge of 500 parts-by-weight total monomer.

A pre-emulsion was formed of 150 parts-by-weight water, 50 parts-by-weight Triton ® X-200 (28% active), manufactured and sold by Rohm & Hass Co., and the balance of the monomers in the proportions shown in Table I, but to supply a total monomer charge of 500 parts by weight less the amount of dibutyl fumarate added to the kettle. There was then added 2 parts-by-weight tertiarybutyl hydrogen peroxide. There was formed as a reducing agent, 2 parts-by-weight sodium formaldehyde sulfoxylate in 150 parts-by-weight water. At a total solids content of 47.6% by weight, the maintained reaction temperature was about 45° C. The preemulsion was added gradually to the reactor over a period of 120 minutes. The reactants were raised to about 60° C. for 1 hour. Again, a nitrogen atmosphere was maintained. The products of reaction were cooled to room temperature after completion of the reaction.

Table II shows the adhesive properties of the uncrosslinked adhesives prepared following the above procedures, using as a substrate G-vinyl, manufactured by Kelex Corporation, Brooklyn, N.Y., with the adhesive neutralized to a pH of from 6.5 to 7.0.

Table III shows the adhesive values of the polymers of Examples 2–4 to a Kelex vinyl, with the adhesive neutralized to a pH of 6.5 and 7.0, while Table IV shows the adhesive properties with respect to a Kelex vinyl, with the polymers crosslinked using 0.1% by weight chromium acetate ($CrAc_3$) as the crosslinking agent.

Table V shows the bonding properties of the polymers of Examples 2–5 to a Kelex vinyl. Crosslinking has a significant affect on cohesive strength.

TABLE I

|  | Example 1 | Example 2 | Example 3 | Example 4 | Example 5 |
|---|---|---|---|---|---|
| 2-ethyl-hexyl-acrylate | 62 | 55 | 55 | 55 | 55 |
| methyl-methacrylate | 18 | 23 | 18 | 23 | 18 |
| acrylic acid | 5 | 2 | 2 | 2 | 2 |
| dibutyl fumarate | 15 | 20 | 25 | 20 | 25 |
| dodecyl mercaptan | 0.14 | 0.14 | 0.14 | 0.04 | 0.04 |

TABLE II

Initial Testing on Kelex G-Vinyl, Polymer Uncrosslinked

|  | Example 1 | Example 2 | Example 3 | Example 4 | Example 5 |
|---|---|---|---|---|---|
| 180° peel, 20' dwell SS, N/25 mm | $17.4_p$ | $23.0_{sps}$ | $25.0_{c/ps}$ | $19.0_p$ | $19.2_p$ |
| looptack, SS, N/25 mm | $11.3_p$ | $16.0_p$ | $8.1_p$ | $14.1_p$ | $11.9_p$ |
| 500 g RTS SS, ½" × ½", hrs. | 24+ | $2.7_c$ | $0.7_c$ | $7.0_c$ | $4.4_c$ |
| coating weight, g/m² | 28 | 28 | 29 | 27 | 27 |

$p$ = panel failure
$c$ = cohesive failure
$ps$ = failure with panel staining
$sps$ = failure with slight panel staining

TABLE III

Initial Testing on Vinyl, Adhesive Uncrosslinked

|  | Example 2 | Example 3 | Example 4 | Example 5 |
|---|---|---|---|---|
| 180° peel, 20' dwell, SS, N/25 mm | $23.5_{sps}$ | $26.0_{c/ps}$ | $21.0_{sps}$ | $21.4_{sps}$ |
| looptack, SS, N/25 mm | $16.4_p$ | $14.6_p$ | $14.4_p$ | $14.7_p$ |
| 500 g RTS, SS, ½" × ½", hrs. | $2.5_c$ | $1.0_c$ | $9.9_c$ | $4.4_c$ |
| coating weight, g/m² | 28 | 29 | 26 | 29 |

$p$ = panel failure
$c$ = cohesive failure
$ps$ = failure with panel staining
$sps$ = failure with slight panel staining

TABLE IV

Initial Testing on Kelex G-Vinyl Adhesive Crosslinked with 0.1% Chromium Acetate

|  | Example 1 | Example 2 | Example 3 | Example 4 | Example 5 |
|---|---|---|---|---|---|
| 180° peel, 20' dwell SS, N/25 mm | $18.0_p$ | $21.0_{sps}$ | $20.6_{sps}$ | $17.2_p$ | $17.5_p$ |
| looptack, SS, N/25 mm | $11.0_p$ | $11.4_p$ | $14.7_p$ | $13.0_p$ | $12.2_p$ |
| 500 g RTS, SS, ½" × ½", hrs. | 24+ | $17.0_c$ | $21.8_c$ | 24+ | 24+ |
| coating weight, g/m² | 27 | 29 | 30 | 30 | 32 |

$p$ = panel failure
$c$ = cohesive failure
$ps$ = failure with panel staining
$sps$ = failure with slight panel staining

TABLE V

Initial Testing on Kelex G-Vinyl Adhesive Crosslinked with 0.1% Chromium Acetate

|  | Example 2 | Example 3 | Example 4 | Example 5 |
|---|---|---|---|---|
| 180° peel, 20' dwell SS, N/25 mm | $25.0_p$ | $18.8_{sps}$ | $19.7_p$ | $17.2_p$ |
| looptack, SS, N/25 mm | $16.1_p$ | $10.3_p$ | $12.8_p$ | $12.7_p$ |
| 500 g RTS, SS, ½" × ½", | 24+ | $8.5_c$ | 24+ | 24+ |

TABLE V-continued

Initial Testing on Kelex G-Vinyl
Adhesive Crosslinked with 0.1% Chromium Acetate

| | Example 2 | Example 3 | Example 4 | Example 5 |
|---|---|---|---|---|
| hrs. | | | | |
| coating weight, g/m² | 31 | 28 | 30 | 30 |

$p$ = panel failure
$c$ = cohesive failure
$ps$ = failure with panel staining
$sps$ = failure with slight panel staining

EXAMPLE 6

Following the second procedure disclosed for Examples 1 to 5, except that the surfactant was Dowfax 2A1 (40% solids), there was formed an interpolymer comprised of 15 parts-by-weight dibutyl fumarate; 60 parts-by-weight 2-ethylhexylacrylate; 20 parts-by-weight vinyl acetate; and 5 parts-by-weight acrylic acid.

Solid content was 50%, and pH was 4.6.

Table VI shows the adhesive properties on Kelex G-Vinyl at a coating weight of 27–29 g/m² for uncrosslinked and crosslinked adhesives (0.5% by weight chrome acetate), while Table VII shows adhesive properties on silver vinyl for crosslinked adhesive at the chrome-triacetate levels shown.

TABLE VI

| Property | Uncrosslinked | Crosslinked |
|---|---|---|
| 180° peel, N/25 mm | 20.1$_p$ | 20.6$_p$ |
| looptack, N/25 mm | 14.9$_p$ | 12.3$_p$ |
| RT 500 shear, hr. | 17 hr.$_c$ | 40.8 hr.$_{c/ps}$ |

TABLE VII

| Property | 0.1% CrAc₃ | 0.2% CrAc₃ | 0.3% CrAc₃ |
|---|---|---|---|
| 90° peel, N/25 mm, 20 min. | 11$_p$ | 10.9$_p$ | 10.5$_p$ |
| 90° peel, N/25 mm, 24 hr. | 15.7$_p$ | 15.3$_p$ | 15.3$_p$ |
| looptack, N/25 mm | 12.7$_p$ | 12.2$_p$ | 13.6$_p$ |
| RT 500 shear, hr. | 60$_c$ | 75$_{ps}$ | 75$_{pp}$ |

EXAMPLE 7

A series of emulsion polymerizations were run, employing controlled amounts of the monomers dibutyl fumarate 2-ethylhexylacrylate, methylmethacrylate, and acrylic acid. Fifteen different monomer combinations were selected. Dibutyl fumarate ranged from 0% to 20% by weight; 2-ethylhexylacrylate ranged from 51% to 94% by weight; methylmethacrylate ranged from 0% to 23% by weight; and acrylic acid ranged from 2% to 6% by weight. Reactor pH ranged from 5.2 to 5.6, and polymer pH ranged from 2.8 to 3.0. With dibutyl fumarate as the initial charge, monomer addition ranged over a period of from 85 to 163 minutes. Polymerization temperature ranged from 45° to 50° C. Solids content ranged from 55.2% to 59.8%, with reactor agitation being from 100 to 600 RPM. Reaction was run under autogenous conditions. Regressive analysis of the data of the properties of the polymers formed showed a high degree of correlation of adhesion to various substrates, namely, mylar and vinyl.

Figure 1:
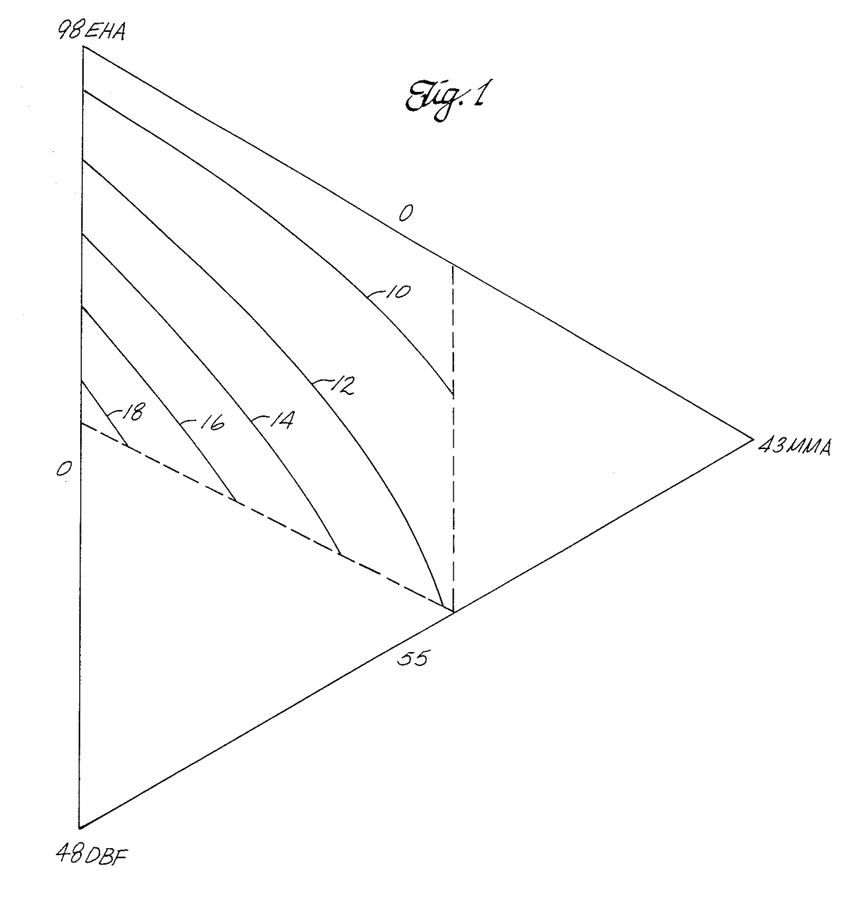
FIG. 1 depicts the effect of dibutyl fumarate on tack, and establishes that dibutyl-fumarate content effectively controls tack. The substrate is vinyl.
Figure 2:
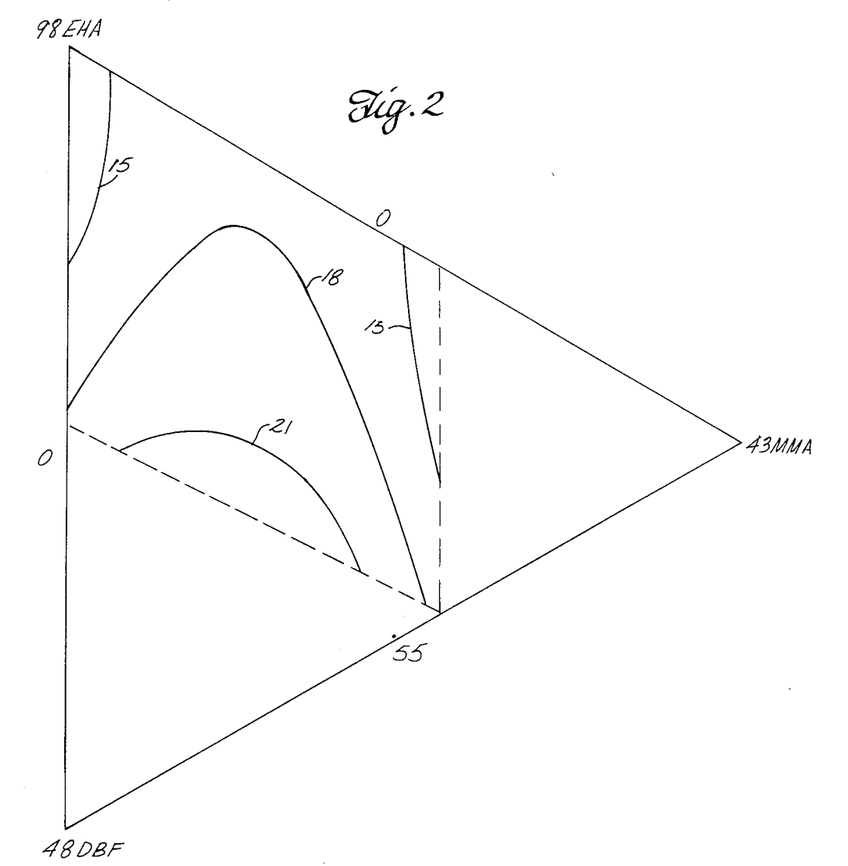
FIG. 2 depicts the effect of dibutyl fumarate on peel, and establishes that dibutyl-fumarate content effectively controls peel. The substrate is vinyl.
Figure 3:
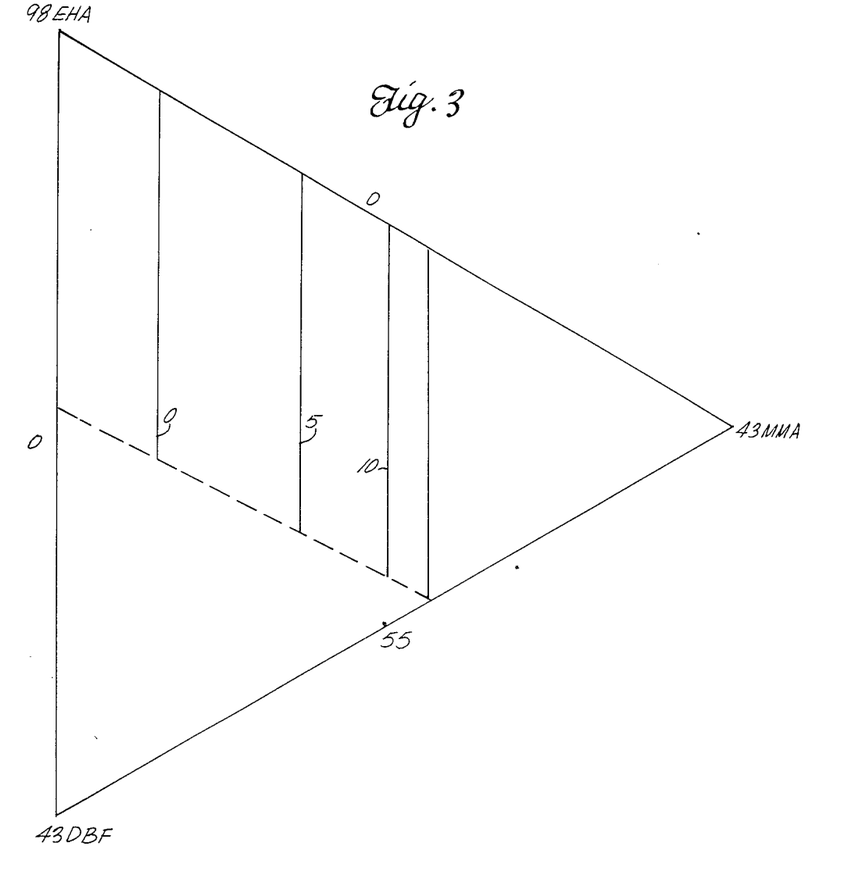
FIG. 3 illustrates, for the monomer system shown, the influence of methylmethacrylate on cohesive stength (shear), and establishes that its concentration can be effectively employed to control the cohesive-strength properties of the polymer. The substrate is vinyl.

With reference to the tertiary diagrams of FIGS. 1 and 2, valid predictions were obtained from polymer performance within the region by the lines: methylmethacrylate—23; dibutyl fumarate—20; and 2-ethylhexylacrylate—94. As shown in FIG. 1, peel and tack could be controlled, independent of all other factors, by dibutyl fumarate content, with peel increasing as dibutyl fumarate content of the polymer increased. As shown in FIG. 2, shear values increased, were independently influenced by concentration of methylmethacrylate, and increased with its concentration.

What is claimed is:

1. A pressure-sensitive adhesive which is an interpolymer formed of an interpolymerizable hard-monomer system comprising at least one alkyl methacrylate containing from about 2 to about 6 carbon atoms, said hard-monomer system being present in an amount up to about 25% by weight, based on the total weight of the monomers, said alkyl methacrylate independently controlling cohesive strength of the interpolymer, and an unsaturated carboxylic acid containing from about 2 to about 8 carbon atoms and present in a positive amount up to about 10% by weight of the monomers; and a soft-monomer system comprising at least one alkyl diester of fumaric acid in which each alkyl group independently contains from about 2 to about 8 carbon atoms, said alkyl diester of fumaric acid being present in an amount up to about 30% by weight, based on the total weight of the monomers and independently controlling tack and peel of the formed interpolymer, and at least one additional soft monomer, including at least one alkyl acrylate, said adhesive being formed by an emulsion polymerization process in which, to a first emulsion containing from about 80% to about 100% of the total alkyl diester of fumaric acid, there is added, under polymerization conditions, a second emulsion containing the other monomers.

2. A pressure-sensitive adhesive as claimed in claim 1 in which there is present as part of the hard-monomer system a vinyl-unsaturated monomer having a homopolymerization glass-transition temperature of greater than other 0° C.

3. A pressure-sensitive adhesive as claimed in claim 2 in which the vinyl-unsaturated monomer is vinyl acetate.

4. A pressure-sensitive adhesive as claimed in claim 1 in which the additional soft monomer is 2-ethylhexlacrylate.

5. A pressure-sensitive adhesive as claimed in claim 1 in which the alkyl methacrylate is methylmethacrylate.

6. A pressure-sensitive adhesive as claimed in claim 1 in which the diester of fumaric acid is dibutyl fumarate.

7. A pressure-sensitive adhesive comprising, based on the total weight of an interpolymerized monomer system, from about 50% to about 95% by weight soft monomers having a homopolymerization glass-transition temperature of less than 0° C., of which from about 5% to about 30% by weight, based on the total weight of the monomer system, is at least one diester of fumaric acid in which each ester group independently contains from about 2 to about 8 carbon atoms and which is provided to independently control adhesive tack and peel, the balance of soft monomers being an alkyl acrylate containing from about 2 to about 10 carbon atoms, and the balance of the monomer system, required to form a 100-parts-by-weight monomer, being comprised of hard monomers having a homopolymerization glass-transition temperature of greater than about 0° C., said hard monomers including at least one alkyl methacrylate containing from about 2 to about 6 carbon atoms and being present in an amount up to 25% by weight, based on the total weight of the monomer system, to independently control cohesive strength of the adhesive, and an unsaturated carboxylic acid containing from about 2 to about 8 carbon atoms and being present in a positive amount of up to 10% by weight, based on the total weight of the monomers, said adhesive being formed by an emulsion polymerization process in which, to a first emulsion containing from about 80% to about 100% of the total alkyl diester of fumaric acid, there is added, under polymerization conditions, a second emulsion containing the other monomers.

8. A pressure-sensitive adhesive as claimed in claim 7 in which the unsaturated carboxylic-acid content of the polymer is from about 2% to about 7% by weight, based on the total weight of the monomers, and the carboxylic acid is acrylic acid.

9. A pressure-sensitive adhesive interpolymer containing, on an interpolymerized basis and based on the total weight of the monomers, from about 5% to about 30% by weight dibutyl fumarate, from about 55% to about 95% by weight 2-ethylhexylacrylate, methlmethacrylate in an amount up to about 20% by weight, and an acrylic acid in a positive amount up to about 10% by weight, said adhesive being formed by an emulsion polymerization process in which, to a first emulsion containing from about 80% to about 100% of the dibutyl fumarate, there is added, under polymerization conditions, a second emulsion containing the other monomers, the tack and peel of the adhesive interpolymer being independently controlled by dibutyl fumarate content, and the cohesive strength of the adhesive interpolymer being independently controlled by methylmethacrylate content.

10. A pressure-sensitive adhesive as claimed in claim 9 in which vinyl acetate is present.

11. A pressure-sensitive adhesive interpolymer containing, on an interpolymerized basis and based on the total weight of the monomers, from about 5% to about 30% by weight dibutyl fumarate, from about 55% to about 90% by weight 2-ethylhexylacrylate, from about 10% to about 25% by weight methylmethacrylate, and from about 2% to about 7% by weight acrylic acid, said adhesive being formed by an emulsion polymerization process in which, to a first emulsion containing from about 80% to about 100% of the dibutyl fumarate, there is added, under polymerization conditions, a second emulsion containing the other monomers, the tack and peel of the adhesive interpolymer being independently controlled by dibutyl fumarate content, and the cohesive strength of the adhesive interpolymer being independently controlled by methylmethacrylate content.

12. A pressure-sensitive adhesive as claimed in claim 11 in which vinyl acetate is present.

13. A process for the production of pressure-sensitive adhesives, which process comprises:
(a) forming a first aqueous emulsion system of at least ond alkyl diester fumarate, in which each ester group thereof individually contains from about 2 to about 6 carbon atoms, the dibutyl fumarate content of the emulsion being from about 80% to 100% by weight of polymerizable monomers contained therein, said first aqueous emulsion system including a free-radical catalyst;
(b) forming a second aqueous emulsion system of monomers for polymerization with the diester of fumaric acid, said monomers including at least one monomer having a homopolymerization glass-transition temperature of less than about 0° C. and including an alkyl methacrylate, and an unsaturated carboxylic acid containing from about 2 to about 8 carbon atoms and present in a positive amount up to about 10% by weight, based on the total weight of the monomers; and at least one soft monomer having a homopolymerization glass-transition temperature of greater than about 0° C. and including an alkyl acrylate, the total of monomers being predetermined to provide a pressure-sensitive adhesive having a homopolymerization glass-transition temperature of from about 30° C. to about 70° C. below the use temperature of the pressure-sensitive adhesive;
(c) initiating free-radical polymerization of the first aqueous emulsion under autogenous conditions; and
(d) continuing free-radical polymerization in the substantial absence of oxygen with gradual addition of the second aqueous emulsion system while maintaining polymerization temperature below about 100° C.

14. A process as claimed in claim 13 in which the first aqueous emulsion system contains the diester of fumaric acid as essentially the sole monomer.

15. A process as claimed in claim 13 in which the first aqueous emulsion system comprises dibutyl fumarate.

16. A process as claimed in claim 14 in which the first aqueous emulsion system comprises dibutyl fumarate.

17. A process as claimed in claim 13 in which the second aqueous emulsion system comprises methylmethacrylate and 2-ethylhexylacrylate.

18. A process as claimed in claim 15 in which the second aqueous emulsion system comprises methylmethacrylate and 2-ethylhexylacrylate.

19. A process as claimed in claim 16 in which the second aqueous emulsion solution comprises methylmethacrylate and 2-ethylhexylacrylate.

20. A process as claimed in claim 17 in which the unsaturated carboxylic acid is acrylic acid and is present in the second aqueous emulsion system.

21. A process as claimed in claim 16 in which acrylic acid is present in the second aqueous emulsion system.

22. A pressure-sensitive adhesive which is an interpolymer formed of an interpolymerizable hard-monomer system comprising at least one alkyl methacrylate containing from about 2 to about 6 carbon atoms, said hard-monomer system being present in an amount up to about 25% by weight, based on the total weight of the monomers, said alkyl methacrylate independently controlling cohesive strength of the interpolymer and an unsaturated carboxylic acid containing from about 2 to about 8 carbon atoms and present in a positive amount up to about 10% by weight of the monomers, and a soft-monomer system comprising at least one alkyl diester of fumaric acid in which each alkyl group independently contains from about 2 to about 8 carbon atoms, said alkyl diester of fumaric acid being present in an amount up to about 30% by weight, based on the total weight of the monomers each alkyl group, said alkyl diester of fumaric acid independently controlling tack and peel of the formed interpolymer, and at least one additional soft monomer, including at least one alkyl acrylate, said adhesive being formed by an emulsion polymerization process in which, to a first emulsion containing about 20% of the total monomers, there is added over a period of time, under polymerization conditions, a second emulsion containing the balance of the monomers, the monomer content of the first and second emulsions being substantially in proportion to the monomer content of the adhesive interpolymer.

23. A pressure-sensitive adhesive interpolymer comprising, based on the total weight of an interpolymerized monomer system, from about 50% to about 95% by weight soft monomers having a homopolymerization glass-transition temperature of less than 0° C., of which from about 5% to about 30% by weight, based on the total weight of the monomer system, is at least one diester of fumaric acid in which each ester group independently contains from about 2 to about 8 carbon atoms and which is provided to independently control adhesive tack and peel, the balance of soft monomers being an alkyl acrylate containing from about 2 to about 10 carbon atoms, and the balance of the monomer system, required to form a 100-parts-by-weight monomer, being comprised of hard monomers having a homopolymerization glass-transition temperature of greater than about 0° C., said hard monomers including at least one alkyl methacrylate containing from about 2 to about 6 carbon atoms and being present in an amount up to 25% by weight, based on the total weight of the monomer system, to independently control cohesive strength of the adhesive, and an unsaturated carboxylic acid containing from about 2 to about 8 carbon atoms and being present in a positive amount of up to 10% by weight, based on the total weight of the monomers, said adhesive being formed by an emulsion polymerization process in which, to a first emulsion containing about 20% of the total monomers, there is added over a period of time, under polymerization conditions, a second emulsion containing the balance of the monomers, the monomer content of the first and second emulsions being substantially in proportion to the monomer content of the adhesive interpolymer.

24. A pressure-sensitive adhesive interpolymer containing, on an interpolymerized basis and based on the total weight of the monomers, from about 5% to about 30% by weight dibutyl fumarate, from about 55% to about 90% by weight 2-ethylhexylacrylate, from about 10% to about 25% by weight methylmethacrylate, and from about 2% to about 7% by weight acrylic acid, said adhesive being formed by an emulsion polymerization process in which, to a first emulsion containing about 20% of the total monomers, there is added over a period of time, under polymerization conditions, a second emulsion containing the other monomers, the monomer content of the first and second emulsions being substantially in proportion to the monomer content of the adhesive interpolymer, the tack and peel of the adhesive interpolymer being independently controlled by dibutyl fumarate content, and the cohesive strength of the adhesive interpolymer being independently controlled by methylmethacrylate content.

25. A pressure-sensitive adhesive which is an interpolymer formed of an interpolymerizable hard-monomer system comprising at least one alkyl methacrylate containing from about 2 to about 6 carbon atoms, said hard-monomer system being present in an amount up to about 25% by weight, based on the total weight of the monomers, said alkyl methacrylate independently controlling cohesive strength of the interpolymer, and acrylic acid present in a positive amount up to about 10% by weight of the monomers; and a soft-monomer system comprising at least one alkyl diester of fumaric acid in which each alkyl group independently contains from about 2 to about 8 carbon atoms, said alkyl diester of fumaric acid being present in an amount up to about 30% by weight, based on the total weight of the monomers and independently controlling tack and peel of the formed interpolymer, and at least one additional soft monomer, including at least one alkyl acrylate, said adhesive being formed by an emulsion polymerization process in which, to a first emulsion containing from about 80% to about 100% of the total alkyl diester of fumaric acid, there is added, under polymerization conditions, a second emulsion containing the other monomers.

26. A pressure-sensitive adhesive comprising, based on the total weight of an interpolymerized monomer system, from about 50% to about 95% by weight soft monomers having a homopolymerization glass-transition temperature of less than 0° C., of which from about 5% to about 30% by weight, based on the total weight of the monomer system, is at least one diester of fumaric acid in which each ester group independently contains from about 2 to about 8 carbon atoms and which is provided to independently control adhesive tack and peel, the balance of soft monomers being an alkyl acrylate containing from about 2 to about 10 carbon atoms, and the balance of the monomer system, required to form a 100-parts-by-weight monomer, being comprised of hard monomers having a homopolymerization glass-transition temperature of greater than about 0° C., said hard monomers including at least one alkyl methacrylate containing from about 2 to about 6 carbon atoms and being present in an amount up to 25% by weight, based on the total weight of the monomer system, to independently control cohesive strength of the adhesive, and an acrylic acid containing from about 2 to about 8 carbon atoms and being present in a positive amount of up to 10% by weight, based on the total weight of the monomers, said adhesive being formed by an emulsion polymerization process in which, to a first emulsion containing from about 80% to about 100% of the total alkyl diester of fumaric acid, there is added, under polymerization conditions, a second emulsion containing the other monomers.

27. A process for the production of pressure-sensitive adhesives, which process comprises:
(a) forming a first aqueous emulsion system of at least one alkyl diester fumarate, in which each ester group thereof individually contains from about 2 to about 6 carbon atoms, the dibutyl fumarate content of the emulsion being from about 80% to 100% by weight of polymerizable monomers contained therein, said first aqueous emulsion system including a free-radical catalyst;
(b) forming a second aqueous emulsion system of monomers for polymerization with the diester of fumaric acid, said monomers including at least one monomer having a homopolymerization glass-transition temperature of less than about 0° C. and including an alkyl methacrylate, and an acrylic acid containing from about 2 to about 8 carbon atoms and being present in a positive amount up to about 10% by weight, based on the total weight of the monomers; and at least one soft monomer having a homopolymerization glass-transition temperature of greater than about 0° C. and including an alkyl acrylate, the total of monomers being predetermined to provide a pressure-sensitive adhesive having a homopolymerization glass-transition temperature of from about 30° C. to about 70° C. below the use temperature of the pressure-sensitive adhesive;

(c) initiating free-radical polymerization of the first aqueous emulsion under autogenous conditions; and (d) continuing free-radical polymerization in the substantial absence of oxygen with gradual addition of the second aqueous emulsion system while maintianing polymerization temperature below about 100° C.

* * * * *

UNITED STATES PATENT AND TRADEMARK OFFICE
CERTIFICATE OF CORRECTION

PATENT NO. : 4,564,664
DATED : January 14, 1986
INVENTOR(S) : Man-Chium Chang, et al.

It is certified that error appears in the above-identified patent and that said Letters Patent is hereby corrected as shown below:

IN THE SPECIFICATION

Column 5, line 5, change "emulsifiedmonomer" to -- emulsified-monomer --.

Column 7, line 24, change "0.5%" to read -- 0.15% --.

IN THE CLAIMS

Column 9, line 64, claim 13, change "ond" to -- one --.

Signed and Sealed this

Sixth Day of January, 1987

*Attest:*

DONALD J. QUIGG

*Attesting Officer*  *Commissioner of Patents and Trademarks*